United States Patent
Tsuruta et al.

[15] 3,694,522
[45] Sept. 26, 1972

[54] PROCESS FOR PRODUCING A AROMATIC VINYL POLYMER COMPOSITONS

[72] Inventors: Masami Tsuruta, Odawara; Shinji Ito; Ichiro Otsuka, both of Yokohama, all of Japan

[73] Assignee: Mitsui Toatsu Chemicals, Incorporated, Tokyo, Japan

[22] Filed: Sept. 29, 1970

[21] Appl. No.: 76,625

[30] Foreign Application Priority Data

Oct. 4, 1969 Japan..................44/78953

[52] U.S. Cl.............260/878 R, 260/80.78, 260/879
[51] Int. Cl........................C08f 15/40, C08f 45/68
[58] Field of Search................260/878 R, 886, 879

[56] References Cited

UNITED STATES PATENTS 3,538,190   11/1970   Meredith et al........260/878 R
3,188,364    6/1965   Brown et al. .............260/886

Primary Examiner—James A. Seidleck
Assistant Examiner—A. Holler
Attorney—Christen & Sabol

[57] ABSTRACT

Aromatic vinyl polymer compositions are produced by dissolving 1 to 20 parts by weight of an ethylene-propylene-nonconjugated diene terpolymer rubber and from 5 to 50 percent by weight based on said terpolymer rubber of a polymer having the general formula:

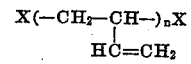

wherein X is hydrogen, $C_2H_4OH$ or COOH and n is an average polymerization degree of 10 to 100 in 100 parts by weight of an aromatic vinyl monomer, prepolymerizing the solution by bulk-polymerization and then completing the polymerization by bulk-polymerization or suspension polymerization.

10 Claims, No Drawings

PROCESS FOR PRODUCING A AROMATIC VINYL POLYMER COMPOSITONS

The present invention relates to a process for producing aromatic vinyl polymer compositions which are high in weather-proofness and impact strength by combining an aromatic vinyl monomer, an ethylene-propylene-nonconjugated diene terpolymer rubber and a hereinafter described specific polymer (A), respectively, at specific mixing ratios.

Such aromatic vinyl polymers as, for example, polystyrenes are so low in impact strength that various methods have been suggested in the past to elevate and improve it. The most generally practiced prior art method is to impregnate an aromatic vinyl polymer with a synthetic rubber. A typical resin (aromatic vinyl polymer composition) made by thus impregnating an aromatic vinyl polymer with a synthetic rubber is high-impact-polystyrene or ABS resin.

The present inventors have discovered that in order to impart effective impact strength to an aromatic vinyl polymer with a synthetic rubber while not impairing the melt flow characteristics for molding, it is important to satisfy the following three requirements:

1. The synthetic rubber should be uniformly dispersed in the aromatic vinyl polymer phase as a phase (which shall hereinafter be called a microgel) which is dispersed in the form of microparticles having a particle diameter of 0.05 to 15 $\mu$.;
2. The affinity between the above described microgel and the aromatic vinyl polymer phase should be sufficient and substantial; and
3. The above mentioned microgel should not be deformed or destroyed by the high shearing stress of the molding procedure.

From the standpoint of satisfying the above mentioned three requirements, the following is a description of a conventional preparation of a high-impact-polystyrene which is most extensively used among known aromatic vinyl polymer compositions.

A synthetic rubber having an unsaturated bond in the main chain of a butadiene series is dissolved in a styrene monomer. The solution is polymerized by bulk-polymerization and is mechanically agitated until the conversion is from about 10 to 40 percent to obtain a prepolymer. The phase containing the synthetic rubber is separated following the initial polymerization and uniformly dispersed by a shearing stress accompanied by agitation into a phase containing a polystyrene formed as a microgel having particle diameters of 0.05 to 15 $\mu$ through a process of phase inversion. A prepolymerization is thus formed. Then the polymerization is continued by bulk-polymerization or suspension-polymerization until it is completed. Due to the graft-copolymerization reaction caused between the synthetic rubber and the remaining styrene monomer by this latter polymerization, an affinity is achieved between the microgel and the polystyrene phase. In addition, due to the cross-linking reaction of the synthetic rubber which occurs simultaneously with the above described graftcopolymerization, a tough microgel which is not deformed or de-stroyed even by the shearing stress of molding is produced.

Conventionally, when making such graft-copolymers, such butadienic rubbers as, for example, a polybutadiene rubber or a styrene-butadiene copolymer rubber is usually used as the synthetic rubber because, due to the large degree of unsaturation both in the main chain and the side chains contained therein, it is so chemically active that the graft-copolymerization reaction with the aromatic vinyl monomer or the cross-linking reaction of the rubber itself is very likely to occur and therefore it is very desirable in satisfying the above-described three requirements.

However, due also to the high unsaturation of the butadiene series synthetic rubbers considered desirable in satisfying the above three requirements, as is well known, said synthetic rubber is very likely to suffer deterioration by ultraviolet radiation, an oxidative atmosphere or heat, so that conventional aromatic vinyl polymer compositions to which high impact strength is imparted by such rubber are inherently so low in weather-proofness that not only their use out of doors but also such uses wherein it is exposed to ultraviolet rays or an oxidative atmosphere are greatly restricted. Therefore, in attempting to improve the low weather-proofness of such conventional impact-proof aromatic vinyl polymer compositions, methods have been suggested wherein saturated rubbers containing substantially no unsaturation in the main chain as, for example, a butyl rubber, acrylate rubber or ethylene-propylene copolymer rubber is used.

However, as is well known, saturated rubbers are so chemically inactive that graft-copolymerization with an aromatic vinyl monomer or cross-linking of the rubber itself is difficult to achieve. It is therefore difficult to satisfy the above three requirements and also very difficult to obtain an aromatic vinyl polymer composition therewith having high impact strength.

It is therefore an object of the present invention to provide a process for producing aromatic vinyl polymer compositions which overcome the defects of conventional resins.

It is another object of the present invention to provide such aromatic vinyl polymer compositions which are high in weather-proofness and impact strength while not being impaired in melt flow characteristics required in molding.

Still further objects and the entire scope of applicability of the present invention will become apparent from the detailed description given hereinafter; it should be understood, however, that the detailed description and specific examples, while indicating preferred embodiments of the invention will become apparent to those skilled in the art from this detailed description.

It has been found that the above objects may be attained by a process characterized by dissolving from 1 to 20 parts by weight of an ethylene-propylene-nonconjugated diene terpolymer rubber and from 5 to 50 percent by weight based on said terpolymer rubber of a copolymer (A) represented by the general formula:

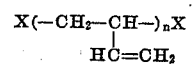

wherein X is selected from the group consisting of hydrogen, $C_2H_4OH$ and $COOH$ and n is an average polymerization degree of from 10 to 100, in 100 parts by weight of an aromatic vinyl monomer, prepolymerizing the obtained solution by bulk-polymerization under agitation and then completing the polymerization by bulk-polymerization or suspension-polymerization.

The aromatic vinyl monomer of the present invention is defined as (1) one or more aromatic vinyl monomers such as, for example, styrene, α-methylstyrene and halo-styrenes as, for example, o-chlorostyrene or p-chlorostyrene, or (2) a mixture of at least 50 percent by weight of said aromatic vinyl monomers and one or more aliphatic vinyl monomers copolymerizable therewith.

Typical aliphatic vinyl monomers copolymerizable with the aromatic vinyl monomers include nitriles such as acrylonitrile and methacrylonitrile and lower esters of acrylic acid and methacrylic acid such as, for example, the lower alkyl esters including methylacrylate, butylacrylate and methylmethacrylate.

Particularly preferable aromatic vinyl monomers and monomer mixtures to be used in the present invention include styrene, a mixture of styrene and α-methylstyrene, a mixture of styrene and acrylonitrile, a mixture of styrene and methylmethacrylate, a mixture of styrene, acrylonitrile and methylmethacrylate, a mixture of styrene, α-methylstyrene and methylmethacrylate and a mixture of α-methylstyrene, acrylonitrile and methylmethacrylate.

The ethylene-propylene-nonconjugated diene terpolymer rubber to be used in the present invention contains substantially no unsaturation in the main chain. Terpolymer rubbers made by copolymerizing a nonconjugated diene with 30 to 70 parts by weight of ethylene and 70 to 30 parts by weight of propylene are preferred.

With a copolymer rubber made by copolymerizing ethylene and propylene alone, that is, one consisting of ethylene and propylene and containing no nonconjugated diene copolymerized therewith, graft-copolymerization reactions and cross-linking of the rubber itself are very difficult to initiate, it is difficult to satisfy requirements (2) and (3) of the above-described three requirements and a composition having satisfactory impact strength cannot be obtained. Therefore, in the present invention, a terpolymer rubber of ethylene, propylene and a nonconjugated diene is used. More particularly, the ethylene-propylene-nonconjugated diene terpolymer rubber contains at least 0.2 mol of the nonconjugated diene copolymerized with a total of 100 mols of ethylene and propylene. Rubbers wherein the amount of the nonconjugated diene is in a range of 0.5 to 5 mols for each total 100 mols of ethylene and propylene are preferred.

The nonconjugated diene of the present invention is a nonconjugated straight chain or cyclic diene hydrocarbon copolymerizable with ethylene and propylene. Typical dienes include straight chain diolefins and branched chain diolefins containing from 5 to 20 carbon atoms in which at least one double bond in the structural formula is terminal as, for example, 1,4-pentadiene, 1,5-hexadiene, 2-methyl-1,5-hexadiene, 1,4-hexadiene, 1,9-octade-cadiene and 6-methyl-1,5-heptadiene. Other typical dienes are cyclic diene hydrocarbons containing eight to 13 carbon atoms and at least two double bonds including unsaturated derivatives of bicyclo [2.2.1] heptane such as, for example, dicyclopentadiene, methylene norbornene and ethylidene norbornene, unsaturated derivatives of bicyclo [2.2.2] octane such as, for example, bicyclo [2.2.2] octa-2,5-diene, unsaturated derivatives of bicyclo [3.2.1] octane and derivatives of bicyclo [3.3.1] nonane. Of the above compounds, 1,4-hexadiene, dicyclopentadiene, methylene norbornene and ethylidene and norbornene are particularly preferred.

The ethylene-propylene-nonconjugated diene terpolymer rubber can be easily obtained by such known conventional processes as are disclosed, for example, in U.S. Pat. No. 3,000,866 or British Pat. No. 880,904.

In the process of the present invention, the quantitative relation between the aromatic vinyl monomer and the ethylene-propylene-nonconjugated diene terpolymer rubber is 1 to 20 parts by weight of the rubber per 100 parts of the aromatic vinyl monomer. If the amount of terpolymer rubber is less than 1 part by weight, there is substantially no improvement in impact strength of the resultant aromatic vinyl polymer composition. When the amount exceeds 20 parts by weight of the terpolymer rubber is difficult to completely dissolve in the aromatic vinyl monomer and, even if it dissolves, the viscosity of the resulting solution is so high that in the prepolymerization step, the terpolymer rubber cannot be uniformly separated and dispersed as a microgel having a particle diameter of 0.05 to 15 $\mu$ in the aromatic vinyl polymer. A microgel having a particle diameter larger than 15 $\mu$ is likely to be produced and therefore the final aromatic vinyl polymer composition does not exhibit the desired impact strength and is too brittle to be acceptable for purposes of the present invention.

The polymer (A) represented by the above-defined general formula is known to the art and is produced by known processes. For example, when butadiene is added to a system containing a Lewis base type compound such as tetrahydrofuran and an alkali metal such as lithium or sodium in the presence of an aromatic hydrocarbon activating agent such as naphthalene or 1,2-diphenyl-benzene so that the system may be anion-polymerized and a reaction terminating agent as defined hereinafter is added to the reaction mixture to terminate the reaction, a polymer (A) which is used in the present invention and in which X in the general formula is hydrogen, $C_2H_4OH$ or COOH is obtained.

More particularly, when a compound containing an active hydrogen such as water, methanol or acetic acid is used as the reaction terminating agent, a polymer (A) wherein X is hydrogen is obtained. When ethylene oxide or carbon dioxide is used for the agent, a polymer (A) wherein X is respectively $C_2H_4OH$ or COOH is obtained.

In order to attain the objects of the present invention, it is necessary that the average polymerization degree ($n$) of the above mentioned polymer (A) should be in a range of 10 to 100. That is, when n is less than 10 the melt flow of the obtained polymer composition is low and molding becomes difficult. When n exceeds 100, the weather-proofness of the obtained polymer composition is reduced and therefore it is undesirable.

The polymer (A) represented by the general formula defined in the present invention is used to satisfy the three requirements and is particularly effective in developing the impact strength improved by the rubber. When the polymer (A) is not used together with the terpolymer rubber or if it is used in an amount less than 5 percent by weight on the terpolymer rubber, said terpolymer rubber cannot be uniformly separated and dispersed as a microgel having a particle diameter of 0.05 to 15 $\mu$ in the final aromatic vinyl polymer in the prepolymerization step and, even if the problem of the particle diameter is ignored, the graft-copolymerization and cross-linking reactions are insufficient, the above mentioned three requirements are not satisfied and therefore the objects of the present invention cannot be attained. If the polymer (A) is used in an amount more than 50 percent by weight based on the terpolymer rubber, the obtained microgel is so hard that the elasticity as of the rubber is lost, both impact strength and weather-proofness are decreased and the objects of the present invention cannot be attained.

However, when 5 to 50 percent by weight of polymer (A) based on the weight of the ethylene-propylene-nonconjugated diene terpolymer rubber is dissolved together with 1 to 20 parts by weight of the terpolymer rubber in 100 parts by weight of an aromatic vinyl monomer and the solution is polymerized according to the present invention, in the prepolymerization step, the terpolymer rubber is very easily and uniformly separated and dispersed as a microgel having a particle diameter of 0.05 to 15 $\mu$ in the aromatic vinyl polymer and, in the subsequent graft-copolymerization step the graft-copolymerization and cross-linking reactions occur with such ease that affinity between the microgel phase and the aromatic vinyl polymer (resin) phase is sufficiently great, and a tough microgel which is not deformed or destroyed even by the high shearing stress of molding is obtained. Therefore, the above-described three requirements are satisfied and an aromatic vinyl polymer composition having high impact strength and excellent in weather-proofness is obtained.

The following is a detailed description of the process for producing aromatic vinyl polymer compositions according to the present invention. First, 1 to 20 parts by weight of an ethylene-propylene-nonconjugated diene terpolymer rubber and a polymer (A) represented by the above-defined general formula and in the above described amount, are dissolved in 100 parts by weight of an aromatic vinyl monomer. Similarly as is carried out, for example, with a butadiene series rubber, the terpolymer rubber of the present invention is finely chopped and is mixed with the aromatic vinyl monomer under agitation at a temperature of 70° to 100° C. for two to four hours to obtain a solution. The polymer (A) used in the present invention may be added and dissolved in the above mixture before, during or after dissolution of the terpolymer rubber in the aromatic vinyl monomer. It is preferred to add the polymer (A) after the terpolymer rubber is dissolved.

When the solution consisting of the aromatic vinyl monomer, the ethylene-propylene-nonconjugated diene terpolymer rubber and the polymer (A) in the mixing proportions defined in the present invention is prepolymerized while being agitated under the conditions defined below usually by bulk-polymerization, the terpolymer rubber is uniformly separated and dispersed in the resultant aromatic vinyl polymer as a microgel having a particle diameter of 0.05 to 15 $\mu$ through a phase inversion. The prepolymerization is carried out with heat alone or in presence of a polymerization catalyst at a temperature of from 50° to 150° C.

The amount of polymerization catalyst used is from 0.05 to 1.0 part by weight and preferably from 0.1 to 0.5 part by weight per 100 parts by weight of the aromatic vinyl monomer. Preferable polymerization catalysts are, for example, organic peroxides including:

1. dialkyl peroxides such as di-t-butyl peroxide, dicumyl peroxide, t-butylcumyl peroxide, 2,5-dimethyl-2,5-di (t-butyl peroxy) hexane and 2,5-dimethyl-2,5-di (t-butyl peroxy) hexane;
2. diacyl peroxides such as lauroyl peroxide and benzoyl peroxide; and
3. peracid esters such as t-butyl peroxybenzoate, t-butyl peracetate, t-butyl perisobutylate, t-butyl peroxyisopropyl carbonate and 2,5-dimethyl-2,5-di (benzoyl peroxy) hexane.

The size of the microgel obtained by the prepolymerization in the present invention is usually of a particle diameter of 0.05 to 15 $\mu$ but may be properly adjusted by such means as adjusting the agitation velocity so that any desired particle diameter within the above range is obtained to provide desired properties for the final aromatic vinyl polymer composition such as, for example, impact strength, rigidity and gloss, depending upon the particular aromatic vinyl monomer which is used. For example, the preferred particle diameter is 1 to 15 $\mu$ when the aromatic vinyl monomer used in styrene alone or a mixture of styrene and methyl methacrylate and is 0.05 to 1 $\mu$ when a mixture of styrene and acrylonitrile is used.

The use of agitation in the prepolymerization step is essential to the separation and dispersion of the terpolymer rubber in the form of particles. The agitation is preferably mechanical agitation and may conveniently be provided by use of agitation means such as mixing blades in the reaction vessel. The agitation velocity is sufficient to disperse the terpolymer rubber into particles having a size within the desired diameter range and will depend upon the size and shape of the reaction vessel and/or of the mixing or agitation blades.

The prepolymerization is continued until the terpolymer rubber is uniformly separated and dispersed in the obtained aromatic vinyl polymer as a microgel of a fixed particle diameter of from 0.05 to 15 $\mu$. The desired separation and dispersion is attained usually during conversion of from 10 to 40 percent of the aromatic vinyl monomer to a polymer although the specific percentage will vary depending on the aromatic vinyl monomer which is used.

In the prepolymerization, additives including chain transfer agents such as, for example, t-dodecylmercaptan, antioxidants such as, for example, trisnonylphenyl phosphite or 2,6-di-t-butylhydroxytoluene and plasticizers such as, for example, mineral oil or butyl stearate may be added as required.

When the prepolymerized solution in which the terpolymer rubber is uniformly dispersed and separated in the obtained aromatic vinyl polymer as a microgel of fixed particle diameter by said prepolymerization is further polymerized as such by bulk-polymerization or by suspension-polymerization while suspended in water containing an inorganic or organic suspending agent, a graft-copolymerization reaction or a cross-linking reaction of said terpolymer rubber is easily conducted, the above three requirements are satisfied and the polymerization is completed.

When polymerization of the prepolymerized solution is conducted in the presence of a polymerization catalyst such as the above described organic peroxide, the graft-copolymerization and cross-linking reactions are more easily obtained than when using heat alone and therefore use of the catalyst is preferred. In this latter polymerization, suspension polymerization is preferred since it facilitates easier removal of the heat of reaction and other adjustment of the reaction than does a bulk-polymerization process.

The polymerization catalyst, when used, is added usually in an amount of from 0.05 to 0.30 part by weight per 100 parts by weight of the prepolymerized solution.

The prepolymerized solution is polymerized usually at a temperature of from 80° to 180° C. and preferably from 100° to 160° C. It has also been found that when the polymerization is conducted at a lower temperature for about half of the time and then at a higher temperature of at least 130° C. for the remainder of the time, particularly after from 70 to 90 percent of the monomer is polymerized such as, for example, initially 100° to 120° C. for two to six hours and then at 130° to 150° C. for two to six hours, the graft-copolymerization and the cross-linking reaction of the rubber are favorably effected and the resultant polymer composition is high in the impact strength. The suspension-polymerization is preferably conducted by using from 20 to 300 parts by weight and preferably from 100 to 200 parts by weight of water and from 0.02 to 0.4 part by weight of a conventional inorganic or organic suspension agent such as, for example, calcium phosphate, magnesium phosphate, a partially saponified polyvinyl alcohol or methylcellulose, per 100 parts by weight of the prepolymerized solution.

The aromatic vinyl polymer composition of the present invention obtained by bulk-polymerization or suspension-polymerization of the prepolymerized solution has melt flow characteristics required for molding and may therefore, by used with any conventional injection-molding or extrusion-molding apparatus. However, prior to molding, as required, additives may be added to improve weather-proofness such as, for example, an antioxidant or ultraviolet ray absorption agent, a lubricant to improve moldability such as, for example, a metallic salt of aliphatic acid and a coloring agent such as, for example, a pigment or dye.

The aromatic vinyl polymer composition obtained by the present invention exhibits improved weather-proofness over conventional high impact strength aromatic vinyl polymers using a butadiene series rubber while also exhibiting impact strength equal to or greater than that of the conventional polymer composition, and therefore can be applied to outdoor uses which have heretofore been limited such as, for example, signboards and electrical devices such as television antenna housings, air conditioner housings and washing machine housings, automobile parts, covers and reflectors for lamps emitting ultraviolet rays such as fluorescent lamps and sterilization lamps, and in agricultural materials and therefore has great utility.

The present invention will be more clearly understood by reference to the following illustrative specific examples wherein parts and percentages are by weight unless otherwise specified. The terms graft degree, impact strength and weather-proofness as used in the tables in the following examples indicate values measured by the following respective methods:

a. Method of measuring the graft degree.

2 grams of a sample were precisely weighed and left overnight at 30° C. in 200 c.c. of methyl ethyl ketone. Then the insoluble gel was separated and obtained with a centrifuge and was dried and precisely weighed.

The graft degree was calculated according to the following formula:

$$\text{Graft degree} = (G-R)/R \times 100$$

wherein G is the amount in grams of the gel insoluble in methyl ethyl ketone and $$R = (\text{Sample weight}) \times (\text{percent of rubber in the sample}) \times 1/100$$

b. Method of measuring impact strength.

A test piece in the form of a disk having a thickness of 1.7 mm. and a diameter of 50 mm. was placed on a base having a concavity of a radius of ¼ inch. An impact core of a radius of ⅛ inch was placed on the disk. A load of 250 grams was dropped from a fixed height onto the disk and it was determined whether or not the disk was broken.

The impact strength value was calculated according to the following formula using as the height that from which five of the 10 test pieces, that is, 50 percent of them, were broken:

Impact strength in kg.-cm. = 0.25 kg. × height in cm.

c. Weather-proofness test.

Disks identical to those used for measuring impact strength were exposed to a Weather-O-Meter model WE-SUN-HC made by Toyo Rika Instrument Company, Ltd., Japan. After time lapses of 100, 200 and 300 hours, the respective test pieces (disks) were removed, impact strengths at the respective times were measured and the retention rate was calculated by the following formula:

$$\text{Retention rate } (\%) = \frac{\text{Impact value after the exposure to Weather-O-Meter}}{\text{Impact value before the exposure to Weather-O-Meter}} \times 100$$

EXAMPLE 1

7 parts of a chopped ethylene-propylene-1,4-hexadiene terpolymer rubber of the composition set forth below and 0.1 part of 2,6-di-t-butylhydroxytoluene were added to 100 parts of a styrene monomer and were agitated at 80° C. for three hours to form a solution. To each of separate preparations of this solution were added 2 parts of mineral oil and a polymer (A) having the structural formula:

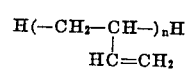

and having an average polymerization degree (n) of 20, in each of the amounts in per cent based on the terpolymer rubber as shown in lines I-2 to I-7 in Table 1. Then 0.5 part of 2,5-di-methyl-2,5-di (t-butyl peroxy) hexane was added thereto as a catalyst. The solution was prepolymerized by bulk-polymerization under agitation at 100° C. Variations in the progress of the polymerization were observed with a phase contrast microscope. When the phase containing the terpolymer rubber became a microgel having a particle diameter of 4 to 6μ and this particle diameter no longer varied to any substantial degree, the prepolymerization was completed. The polymerization conversion was then measured and was within the range of 15 to 18 percent.

0.1 part of t-butyl peroxybenzoate as catalyst was added and mixed into the polymerized solution. Then the solution was dispersed and suspended in 150 parts of an aqueous solution containing 0.2 percent of a partially saponified polyvinyl alcohol having a saponification degree of 80 percent as a suspension agent and was polymerized under agitation at 110° C. for three hours, at 120° C. for two hours and then at 140° C. for five hours. The reaction product slurry was dehydrated and dried to obtain a white granular polymer composition.

The dispersion state and particle diameter of the microgel in each of the resultant compositions were observed with a phase contrast microscope and the results are shown in Table 1. The graft degree of each composition was measured to determine the amount of the graft-copolymerization by the procedure described above. The results are shown in Table 1.

To 100 parts of each of the granular polymer compositions was added 0.05 part of zinc stearate as a lubricant and the mixture was pelleted with an extruder provided with a vent. Then the pellets were injection-molded at 230° C. to obtain a disk of the above-described shape. Using this disk, the state of the microgel after molding was observed with a phase contrast microscope, impact strength was measured by the above-described method and weather-proofness was measured with a Weather-O-Meter. These results are also shown in Table 1.

The composition of the ethylene-propylene-1,4-hexadiene terpolymer rubber used in this example was as follows:

| | |
|---|---|
| Ethylene | 56% by weight |
| Propylene | 44% by weight |
| 1,4-hexadiene | 1.6 mols |

The total number of mols of ethylene and propylene was 100.

For purposes of comparison, two additional experiments were conducted in the same manner as those shown in lines I-2 to I-7 of Table 1. In the first experiment, no polymer (A) was used and the results are shown in line I-1 of the table. In the second, a polybutadiene rubber was used in place of the ethylene-propylene-1,4-hexadiene terpolymer rubber and no polymer (A) was used. These results are shown in the table in line I-8.

TABLE I

| Example No. | Polymer (A) (wt %) | Dispersion state and particle diameter (μ) | Graft degree | State of molded microgel |
|---|---|---|---|---|
| *I-1 | — | Nonuniform. Many particles more than 15μ | 29 | Partly deformed & destroyed. |
| *I-2 | 3 | Nonuniform. Many particles more than 15μ | 43 | Partly deformed & destroyed. |
| I-3 | 5 | Uniform. 4 to 6μ | 85 | Not deformed or destroyed. |
| I-4 | 10 | Uniform. 4 to 6μ | 100 | Not deformed or destroyed |
| I-5 | 30 | Uniform. 4 to 6μ | 105 | No deformed or destroyed. |
| I-6 | 50 | Uniform. 4 to 6μ | 112 | Not deformed or destroyed. |
| *I-7 | 70 | Uniform. 4 to 6μ | 120 | Considerably destroyed. |
| **I-8 | — | Uniform. 4 to 6μ | 118 | Not deformed or destroyed. |

| Example No. | Impact strength (kg.-cm.) | Weather-proofness (Impact strength retention) Weather-O-Meter exposure hrs.) | | | |
|---|---|---|---|---|---|
| | | 0 | 100 | 200 | 300 |
| *I-1 | 6 | 100 | 95 | 92 | 85 |
| *I-2 | 8 | 100 | 94 | 92 | 83 |
| I-3 | 24 | 100 | 94 | 90 | 84 |
| I-4 | 28 | 100 | 96 | 91 | 86 |
| I-5 | 26 | 100 | 95 | 90 | 87 |
| I-6 | 27 | 100 | 94 | 89 | 83 |
| *I-7 | 4 | 100 | 85 | 80 | 75 |
| **I-8 | 23 | 100 | 50 | 20 | 10 |

*Comparison example using proportions outside the range defined in the present invention.
**Comparison example of a conventional high impact polystyrene using a polybutadiene rubber.

EXAMPLE 2

An ethylene-propylene-ethylidene norbornene terpolymer rubber of the composition set forth below was chopped and was dissolved in each of the amounts shown in lines II-2 to II-12 of Table 2 in a monomer mixture consisting of 45 percent methylmethacry-late and 55 percent styrene in the same manner as in Example 1. Then a polymer (A) having the structural formula:

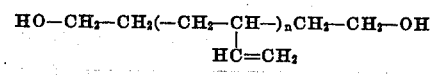

and having an average polymerization degree $(n)$ of 20, was added in the amounts (percentages based on the terpolymer rubber) shown in Table 2 and 2 parts of dibutyl stearate were added and dissolved in the solution. However, in the experiment shown in line II-12 wherein the amount of terpolymer rubber was greater than the range of the present invention, a uniform solution was not obtained. Then 0.1 part of trisnonylphenyl phosphite, 0.5 part of dicumyl peroxide and 0.05 part of t-dodecylmercaptan were added to 100 parts of each solution. The solutions were each prepolymerized by bulk-polymerization under agitation at 95° C. The agitation rate was adjusted so that the size of the microgel was within the range of 2 of 3 μ. However, in the experiment of line II-2 wherein the amount of said rubber used was smaller than the range of the present invention, the size could not be controlled within this range but became 0.5 to 1 μ. Further, in the experiment of line II-12 wherein the terpolymer rubber did not disperse uniformly in the prepolymerization step, even through phase inversion and even though the agitation speed was increased, the phase containing said rubber did not become a microgel having a particle diameter of less than 15 μ but remained a macrogel and the viscosity of the solution was so high that it was difficult to remove the heat of polymerization. The polymerization was concluded at the point when the size of the microgel no longer varied.

Then 0.05 part of t-butyl peroxybenzoate was added and mixed in 100 parts of each prepolymerized solution. The solutions were each dispersed and suspended in 200 parts of an aqueous solution containing 0.4 percent of a partially saponified polyvinyl alcohol having a saponification degree of 80 percent as a suspension agent and was polymerized under agitation at 110° C. for two hours, then at 120° C. for two hours and further at 145° C. for four hours.

Each reaction product slurry thus obtained was dehydrated and dried in the same manner as in Example 1. The dispersion state and particle diameter of the microgel and the graft degree of the obtained polymer composition were measured. Then, in the same manner as in Example 1, each polymer composition was pelleted and injection-molded. The state of the microgel and the impact strength and weather-proofness of the moldings were investigated. The results are shown in Table 2.

The composition of the ethylene-propylene-ethylidene norbornene terpolymer rubber used in this example was as follows:

| | |
|---|---|
| Ethylene | 55% by weight |
| Propylene | 45% by weight |
| Ethylidene norbornene | 2 mols |

The total number of mols of ethylene and propylene was 100.

For purposes of comparison, the results of a copolymer obtained by copolymerizing a monomer mixture consisting of only 45 percent methylmethacrylate and 55 percent styrene without using the ethylene-propylene-ethylidene norbornene terpolymer rubber are shown in line II–1 in Table 2 and the results of an experiment conducted in the same manner as that of line II–4 in Table 2 with the exception that 7 percent of styrene-butadiene copolymer rubber (SBR) containing 25 percent styrene and 75 percent butadiene was used instead of the above-described terpolymer rubber are shown in line II–13 in Table 2 as examples of conventional products.

TABLE II

| Example No. | Monomer mixture (Parts) | Terpolymer rubber (Parts) | Polymer (A) (wt %) | Graft degree (%) | Dispersion State and particle dia. μ of the microgel |
|---|---|---|---|---|---|
| *II–1 | 100 | — | — | — | Uniform |
| *II–2 | 99.5 | 0.5 | 40 | 101 | 0.5 to 1 μ Uniform. |
| II–3 | 95 | 5 | ʼ | 110 | 2 to 3 μ Nonuniform. Many particles of more than 15 μ |
| *II–4 | 93 | 7 | — | 30 | |
| *II–5 | 93 | 7 | 2 | 35 | 37 Uniform. |
| II–6 | 93 | 7 | 10 | 97 | 2 to 3 μ |
| II–7 | 93 | 7 | 30 | 108 | " |
| II–8 | 93 | 7 | 40 | 115 | " |
| *II–9 | 93 | 7 | 70 | 122 | " |
| II–10 | 90 | 10 | 30 | 109 | " |
| II–11 | 85 | 15 | 30 | 111 | " nonuniform. |
| *II–12 | 75 | 25 | 30 | 98 | 5–100 μ uniform. |
| *II–13 | 93 | 7 (SBR) | *— | 115 | 2 to 3 μ |

| Example No. | State of molded microgel | Impact strength (kg.-cm.) | Weather-proofness (Impact strength retention) Weather-O-Meter exposure (hrs.) | | | |
|---|---|---|---|---|---|---|
| | | | 0 | 100 | 200 | 300 |
| *II–1 | — | 2 | 100 | 95 | 90 | 90 |
| *II–2 | Not deformed or destroyed | 3 | " | 93 | 90 | 90 |
| II–3 | " | 27 | " | 95 | 93 | 93 |
| *II–4 | Deformed and destroyed | 8 | " | 93 | 92 | 92 |
| *II–5 | " | 10 | " | 95 | 91 | 90 |
| II–6 | Not deformed or destroyed | 25 | " | 94 | 92 | 92 |
| II–7 | " | 28 | " | 93 | 90 | 90 |
| II–8 | " | 27 | " | 94 | 91 | 90 |
| *II–9 | Destroyed | 8 | " | 89 | 83 | 78 |
| II–10 | Not deformed or destroyed | 32 | " | 92 | 90 | 90 |
| II–11 | " | 38 | " | 93 | 90 | 90 |
| *II–12 | Substantially destroyed | 6 | " | 94 | 92 | 91 |
| *II–13 | Not deformed or destroyed | 24 | " | 60 | 30 | 10 |

*Comparison example using proportions or ingredients outside those of the present invention.

EXAMPLE 3

7 parts each of the ethylene-propylene-nonconjugated diene terpolymer rubbers or ethylene-propylene-copolymer rubbers of the compositions shown in Table 3 were chopped and dissolved in 100 parts of a styrene monomer in the same manner as in Example 1. A polymer (A) having the structural formula:

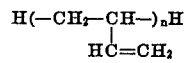

and an average polymerization degree ($n$) of 40, in an amount of 30 percent by weight based on the rubber was dissolved in each solution. 0.3 part of t-butylcumyl peroxide was added to each solution which was then prepolymerized at 100° C. in the same manner as in Example 1 so that the phase containing the terpolymer rubber or the copolymer was dispersed as a microgel having a particle diameter of 6 to 7 μ. Then, 0.1 part of t-butyl peroxyacetate was added as a polymerization catalyst to each prepolymerized solution and was well mixed. Each of the mixtures was suspended in 150 parts of an aqueous solution containing 0.2 part of a partially saponified polyvinyl alcohol having a saponification degree of 80 percent and was polymerized at 110° C. for four hours and then at 145° C. for four hours to substantially complete the polymerization. In the same manner as in Example 1, the graft degree and the dispersion state of the microgel of each polymer composition were measured, after which they were pelleted and injection-molded to form test pieces. The state of the microgel after molding, impact strength and weather-proofness were tested and the results are shown in Table 3.

TABLE III

Composition of ethylene-propylene-nonconjugated diene

| Ex. No. | Kind and amount (a) ethylene/ propylene (weight ratio) | terpolymer rubber or ethylene-propylene copolymer rubber of nonconjugated diene (mols) | Graft degree (%) | Dispersion state and particle diameter ($\mu$) of microgel |
|---|---|---|---|---|
| *III-1 | 60/40 | | 25 | Rater nonuniform 6 to 7 $\mu$ |
| *III-2 | 50/50 | 0 | 27 | " |
| *III-3 | 40/60 | 0 | 26 | " |
| III-4 | 60/40 | 1,4-hexadiene 0.5 | 100 | Uniform. 6 to 7 $\mu$ |
| III-5 | 60/40 | 1,4-hexadiene | 97 | " |
| III-6 | 50/50 | dicyclopentadiene 1.5 | 98 | " |
| III-7 | 40/60 | Ethylidene norbornene 3.0 | 110 | " |

| Example No. | State of molded microgel | Impact strength (kg.-cm.) | Weather-proofness (Impact strength retention) Weather-O-Meter exposure(hrs.) | | | |
|---|---|---|---|---|---|---|
| | | | 0 | 100 | 200 | 300 |
| *III-1 | Deformed and destroyed | 4 | 100 | 91 | 90 | 83 |
| *III-2 | " | 5 | 100 | 92 | 90 | 87 |
| *III-3 | " | 4 | 100 | 94 | 91 | 86 |
| III-4 | Not deformed or destroyed | 27 | 100 | 94 | 90 | 88 |
| III-5 | " | 25 | 100 | 94 | 89 | 85 |
| III-6 | " | 28 | 100 | 96 | 91 | 86 |
| III-7 | " | 30 | 100 | 95 | 90 | 87 |

*Comparison example using proportions outside those of the present invention.
(a) represents number of mols when the total number of moles of ethylene and propylene is 100.

EXAMPLE 4

7 parts by weight of an ethylene-propylene-methylene norbornene terpolymer rubber of the composition described below were chopped and then dissolved in 100 parts by weight of a monomer mixture consisting of 60 percent by weight styrene, 30 percent by weight methylmethacrylate and 10 percent by weight acrylonitrile in the same manner as in Example 1. Polymers (A) having the following structural formula:

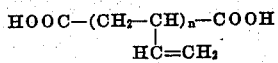

and having average polymerization degrees ($n$) as shown in Table 4 were dissolved in separate preparations of the above solution in an amount of 20 percent by weight based on said terpolymer rubber. 0.5 part of di-tertiary butyl peroxide was added to each obtained solution which was then prepolymerized at 90° C. in the same manner as in Example 1 so that the phase containing the terpolymer rubber was dispersed as a microgel having a particle diameter of 2 to 3 $\mu$. Then 100 parts of each prepolymerized solution were suspended in 150 parts of an aqueous solution containing 0.2 part of a partially saponified polyvinyl alcohol having a saponification degree of 80 percent and were polymerized at 110° C. for four hours and then at 145° C. for four hours to substantially complete the polymerization. The graft degree and the dispersion state of the microgel of each obtained polymer composition were measured in the same manner as in Example 1 and the polymer compositions were pelleted and injection-molded as in Example 1 to form test pieces. The state of the microgel after molding, impact strength and weather-proofness were tested and the results are shown in Table 4.

The composition of the ethylene-propylene-methylene norbornene terpolymer rubber used in this example was as follows:

| Ethylene | 65% by weight |
| Propylene | 35% by weight |
| Methylene norbornene | 2 mols |

The total number of mols of ethylene and propylene was 100.

TABLE IV

| Ex. No. | Average polymerization degree (n) | Graft degree (%) | Dispersion state and particle diameter ($\mu$) of the microgel |
|---|---|---|---|
| *IV-1 | 5 | 90 | Uniform. 2 to 3 $\mu$ |
| IV-2 | 20 | 110 | " |
| IV-3 | 90 | 132 | 37 |
| *IV-4 | 110 | 139 | " |

| Example No. | State of molded microgel | Impact strength (kg.-cm.) | Weather-proofness (Impact strength retention) Weather-O-Meter exposure | | |
|---|---|---|---|---|---|
| | | | 0 | 100 hrs. | 300 |
| *IV-1 | Melt flow characteristics were so low that molding was impossible | | | | |
| IV-2 | Not deformed or destroyed | 42 | 100 | 95 | 90 90 |
| IV-3 | " | 48 | 100 | 93 | 90 89 |
| *IV-4 | " | 30 | 100 | 77 | 50 30 |

*Comparison example showing proportions outside the range defined in the present invention.

What is claimed is:

1. A process for producing aromatic vinyl polymer compositions comprising dissolving 1 to 20 parts by weight of an ethylene-propylene-nonconjugated diene terpolymer rubber and from 5 to 50 percent by weight based on said terpolymer rubber of a polymer represented by the general formula:

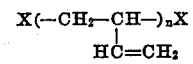

wherein X is selected from the group consisting of hydrogen, $C_2H_4OH$ and COOH and n is an average polymerization degree of from 10 to 100 in 100 parts by weight of an aromatic vinyl monomer, prepolymerizing the obtained solution by bulk-polymerization under agitation for a time and at an agitation rate sufficient to disperse the terpolymer rubber into the resultant aromatic vinyl polymer as a microgel having a particle diameter of from 0.05 to 15 $\mu$ and then completing the polymerization by bulk-polymerization or suspension-polymerization.

2. The process according to claim 1 wherein the aromatic vinyl monomer is selected from the group consisting of styrene, $\alpha$-methylstyrene, a halo-styrene and mixtures thereof and mixtures of at least 50 percent by weight of said aromatic vinyl monomer with an aliphatic vinyl monomer copolymerizable therewith.

3. The process according to claim 2 wherein the aliphatic vinyl monomer is selected from the group consisting of nitriles, lower alkyl esters of acrylic and methacrylic acids and mixtures thereof.

4. The process according to claim 1 wherein the terpolymer rubber contains at least 0.2 mol of nonconjugated diene copolymerized with a total of 100 mols of ethylene and propylene.

5. The process according to claim 4 containing from 0.5 to 5 mols of nonconjugated diene.

6. The process according to claim 1 wherein the prepolymerization is conducted at a temperature of from 50° to 150° C.

7. The process according to claim 6 wherein the prepolymerization is conducted in presence of a polymerization catalyst in the amount of from 0.05 to 1.0 part by weight per 100 parts of aromatic vinyl monomer.

8. The process according to claim 1 wherein the prepolymerized solution is further polymerized at a temperature of from 80° to 180° C until polymerization is complete.

9. The process according to claim 8 wherein said further polymerization is a suspension polymerization.

10. The process according to claim 8 wherein said further polymerization is conducted in presence of from 0.03 to 0.30 part by weight of polymerization catalyst per 100 parts of said prepolymerized solution.

* * * * *